(12) United States Patent
Wang

(10) Patent No.: US 7,184,964 B2
(45) Date of Patent: Feb. 27, 2007

(54) APPLICATION OF SUPPLY CHAIN UNIT CELL OR CELL GROUP OR BOUNDARY CONSERVATION OF VALUE AND QUANTITY TO COMPUTER MANAGEMENT SYSTEM

(76) Inventor: Wu-Chieh Wang, 9F-4, No. 154 Chung Cheng 3rd Road, Kaohsiung (TW)

( * ) Notice: Subject to any disclaimer, the term of this patent is extended or adjusted under 35 U.S.C. 154(b) by 1113 days.

(21) Appl. No.: 09/906,744

(22) Filed: Jul. 18, 2001

(65) Prior Publication Data
US 2002/0128886 A1 Sep. 12, 2002

(30) Foreign Application Priority Data
Jan. 8, 2001 (TW) .............................. 90100395 A

(51) Int. Cl.
*G06F 9/44* (2006.01)
(52) U.S. Cl. .............................................. 705/7; 705/8
(58) Field of Classification Search .................. 705/7, 705/8
See application file for complete search history.

(56) References Cited

U.S. PATENT DOCUMENTS

| | | | |
|---|---|---|---|
| 5,884,300 A | | 3/1999 | Brockman |
| 5,946,662 A | * | 8/1999 | Ettl et al. ................... 705/8 |
| 5,953,707 A | * | 9/1999 | Huang et al. ................ 705/10 |
| 5,970,465 A | * | 10/1999 | Dietrich et al. ............... 705/7 |
| 6,151,582 A | * | 11/2000 | Huang et al. ................... 705/8 |
| 6,167,385 A | | 12/2000 | Hartley-Urquhart |
| 6,606,744 B1 | * | 8/2003 | Mikurak .................... 717/174 |
| 6,671,673 B1 | * | 12/2003 | Baseman et al. ............... 705/7 |
| 6,947,905 B1 | * | 9/2005 | Starr et al. .................. 705/37 |

FOREIGN PATENT DOCUMENTS

JP 11306233 A * 11/1999
WO WO 9910826 A1 * 3/1999

OTHER PUBLICATIONS

Hooper, Neil. "Dynamic distribution planning techniques: progressive logistics optimization for manufacturers," Logistics Information Management, 1996 [retrieved from Dialog].*
Anonymous. "Pepsi's mathematical approach to cutting supply costs," Strategic Direction, Jun. 2000 [retrieved from Dialog].*

(Continued)

Primary Examiner—Catherine M. Tarae
(74) Attorney, Agent, or Firm—Bacon & Thomas, PLLC

(57) ABSTRACT

Computer software for execution by a computer management system to supervise and detect a Boundary Conservation of Value and Quantity in at least one Supply Chain Unit Cell or Cell Group. A warning is output when there is an abnormality detected in the value or quantity in a supply chain unit cell or cell group, and corrective information is provided to the computer management system. A mathematical management logic model of supply Chain Boundary Conservation of Value and Quantity is utilized to perform the management of Supply Chain Boundary Change of Quantity or Value to supervise and detect a quantity or value of raw material, semi-products, as well as finished goods.

6 Claims, 8 Drawing Sheets

OTHER PUBLICATIONS

Disney et al. "Dynamic simulation modeling for lean logistics," International Journal of Physical Distribution & Logistics Management, 1997 [retrieved from Dialog].*

Lewis et al. "An integrated approach to re-engineering material and logistics control," International Journal of Physical Distribution & Logistics Management, 1997 [retrieved from Dialog].*

Morash et al. "Boundary spanning interfaces between logistics, production, marketing and new product development," International Journal of Physical Distribution & Logistics Management, 1996 [retrieved from Dialog].*

* cited by examiner

APPLICATION OF SUPPLY CHAIN UNIT CELL OR CELL GROUP OR BOUNDARY CONSERVATION OF VALUE AND QUANTITY TO COMPUTER MANAGEMENT SYSTEM

TERMINOLOGY

The terminology concerning the invention are described as follows:

Supply Chain:

Supply chain is described as food chain between supply and demand concerning costs, information and logistics. The three are combined as business flow or commonly called supply chain in order to make profits and elevate service to customers.

Supply Chain Management:

Supply chain management is the management that an enterprise manages its supply chain. The scope involves various business procedures and the combination of process between suppliers and ultimate users. The purpose of management is mainly to provide service for the products, to provide information and costs; and to increase the added value to both customers and profit making organizations at various levels. Supply chain management is especially put much emphasis on the business quality improvement and customer satisfaction elevation.

Supply Chain Boundary:

Supply Chain Boundary is mainly to draw a clear-cut line of distinction between the supply and demand food chain boundary of costs, information and logistics and to enable it to virtually accomplish the value and quantity conservation relationship of supply chain.

Single Crystal or Unit Cell:

Unit cell indicates the structural single crystal that will change following the input or output process of the fundamental data of supply chain. It will show the quantity difference or the value difference and is commonly called unit cell or single crystal.

Compound Crystal or Cell Group:

Cell group indicates that to combine the structural single crystal (unit cell) which may change the fundamental data of supply chain, into a cell group. The cell group is capable of executing the process of input from external and output from external and meanwhile the unit cell within the cell group is also executing the process of input from internal and output from internal. It will show the quantity difference or the value difference and is commonly called cell group or compound crystal.

Virtual Enterprise:

The kernel of virtual business status is the narrow of supply chain management. In a narrow sense, virtual enterprise means that a firm should closely assemble all the available internal limited resources to provide top-notch products and best services to the virtually simplified enterprises concerned of the supply chain cell group boundary. In a broad sense, a firm should be able to cope with market rapid transformation to integrate with the external resources, such as customers, suppliers, and financial or/and governmental organizations, to constitute a best and effective global virtualization. The highest target of virtual enterprise operation is to produce virtualized products and services.

FIELD OF THE INVENTION

The invention is a computerized management system in application of supply chain cell or cell group or boundary conservation of value and quantity. It is specifically applied to check the internal business status of an enterprise. With a supply chain management system, the enterprise will be able to immediately recognize the change of any quantity difference or value difference.

It can be used from the raw material, semi-product and finished goods management up to the supply chain cell group electronic business computerized systems among different enterprises. In other words, by virtue of the supply chain management system, various firms will have to set up a virtual enterprise computer management system so as to enable the firms to effectively control and manage the logistics and material costs.

The system will greatly help the production, market, warehouse stock and cost management while entering "e" epoch. With the system, the enterprise will be able to effectively plan and execute the output in the manufacturing process, and to detect and control raw material, semi-product stock and finished goods quantity and cost value etc.

BACKGROUND OF THE INVENTION

Due to rapid change of market, demand and marketing circumstances, the industrial circles from traditional industries to high-tech industries are being confronted with keen changes of global competitiveness. As a result of customers sense of awakening, the uncertainty of marketing production and supply demand, those such as manufacturers, wholesale agents, retail dealers, bank circles, stock market administration as well as end users have to have relatively acute sense of smell which should be able to detect in advance how the market change will be in the future so as to enable themselves to control the structural change of marketing logistics, material costs, quantity difference and cost concept change and further to be able to sufficiently control the process of global supply chain cell group management.

Hence, how to integrate and accelerate supply chain cell group management and how to conduct business process re-engineer will be a prerequisite for the infrastructure which will determine if an enterprise or a company can continuously and permanently operate in the computerized 21st century. Recently there are a few domestic enterprises arising serious financial crisis. Enterprises should take it as a lesson to learn what caused the crisis. It might be caused by sluggish market, economic depression, excessive financial loans or other defective operations.

In addition, one must also consider if it is necessary to proceed with the re-construction of industrial process, to set up a fundamental supply chain unit cell and a brand new supply chain computerized management system. A crisis might be a turning point for a company to being regenerated as a new enterprise.

While entering 21st century, a prerequisite that an enterpriser should have is that one must be able to sense and detect the confronted rapid change and capable taking immediate action in advance. Supply chain cell group boundary management will help you to gain the prerequisite and it should be well used to establish a brand new supply chain computerized management system in order to exist in the 21st century. The model of enterprise competition in the future will be no longer the competition between single enterprises or enterprise groups, but a strategic competition between supply chain cell group and supply chain cell group. It will be a competition of supply chain computerized management system. In the meantime, we firmly believe that to establish a virtual enterprise and a computerized system with automatic crisis pre-warning management facilities will be a prerequisite for companies to be competitive in the 21st century.

For setting up a brand new supply chain computer management system or virtualized enterprise computerized management system to be used by companies in the 21st century, I diligently carried out a research for the fundamental structure of supply chain. Both entry item quantity (EIQ) and entry item value (EIV) analytic methods have been used in the fundamental structure. A calculating method of combined logistics system planning and logistics basic operating costs has been worked out and a supply chain boundary value and quantity conservation computerized software to serve the industrial circles has been further invented. Further more an applied supply chain unit cell/Cell group/boundary conservation of quantity and value supply chain computer management system was invented to enable enterprises to process their logistics center system planning and worked out virtual enterprise and an automatic pre-warning crisis computerized management system. Meanwhile, the computer system is capable of making a return control and management over supply chain cell group. Therefore, the system will be able to accomplish the multi-purposes of sharing technologies, research findings and man power resources with others in order to reduce risks and total costs, to enlarge outputs and business scales, to gain profits in marketing and obtaining customers.

SUMMARY OF THE INVENTION

The major purpose of the invention is to enable the enterprises to use the supply chain computerized management system to conduct supply chain boundary quantity and value conservation software operation in order to supervise or control the quantity or value data management over supply chain unit cell or cell group.

The secondary purpose of the invention is to perform the most effective and economic management in the quantification of logistics stock level management over raw material, semi-products stock and finished goods supply chain cell group boundary information concerned by utilizing supply chain boundary quantity and value conservation computer software operation.

The another purpose of the invention is to set up a virtual enterprise computer management system so as to be able to effectively control and carry out supply chain management for logistics and material costs. Its scope begins from the end user to feed back to the initial supplier including the combination of various commercial procedures and process between suppliers.

Figure 1:
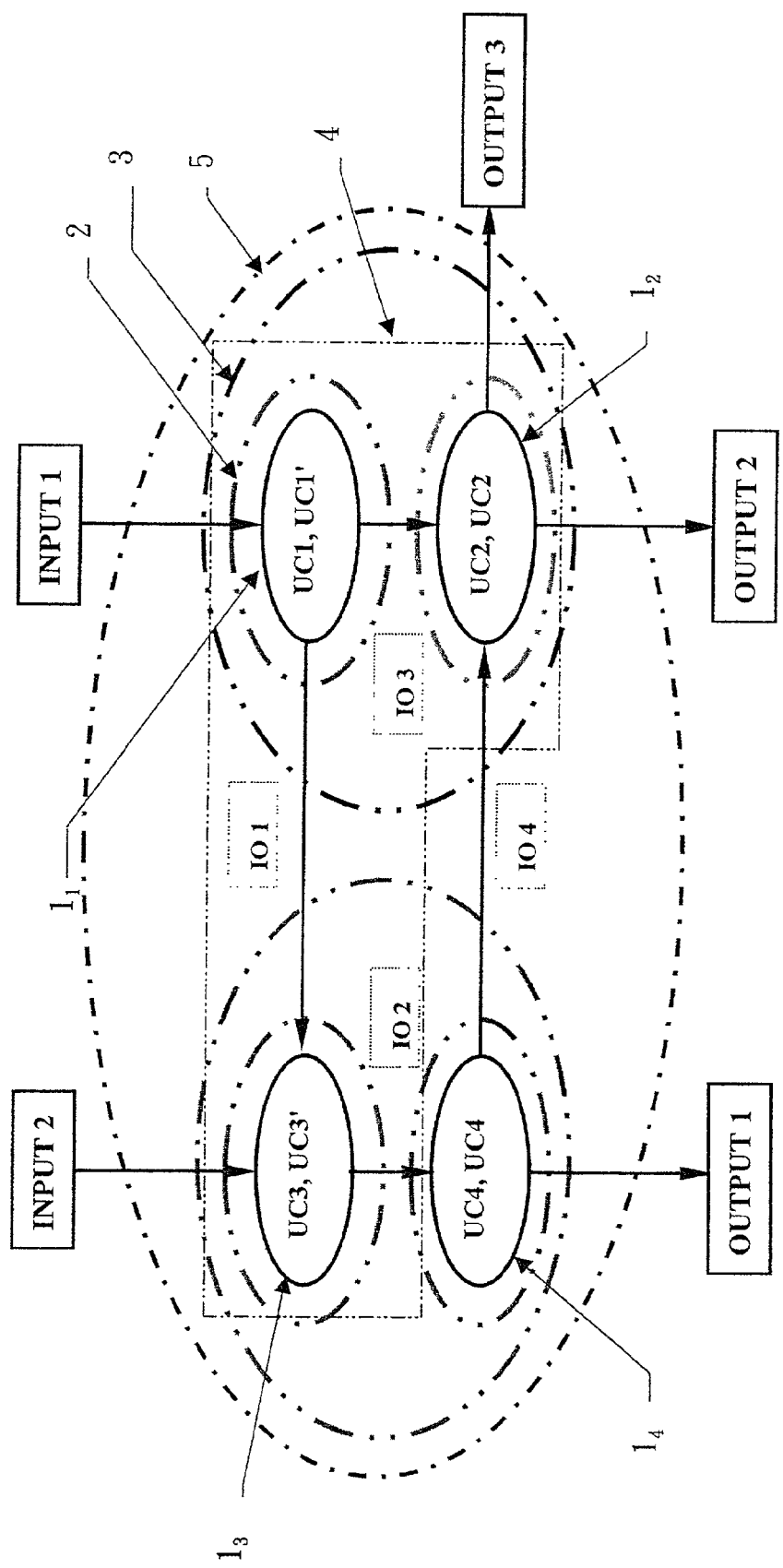
FIG. 1 is a diagram indicating supply chain boundary which includes unit cell supply chain unit crystal or cell group with two, three or four supply chain unit cells conservation of quantity and value.

2. LEGEND ILLUSTRATION ($1_1$)-($1_2$)-($1_3$)-($1_4$) supply chain unit cell.
(2) Supply chain boundary includes unit cell supply chain unit cell.
(3) Supply chain boundary includes cell group that constituted by two supply chain unit cells.
(4) Supply chain boundary includes cell group that constituted by three supply chain unit cells.
(5) Supply chain boundary includes cell group that constituted by four supply chain unit cells.
(6) Supply chain boundary includes cell group that constituted by limited or unlimited supply chain unit cells.
(11) To define supply chain boundary procedures.
(12) To judge m, n, p procedures.
(13) To input m, n, p procedures.
(14) To input entry source of value and quantity procedures.
(15) To input the before ( variance ) transaction phase or end phase quantity and value UC procedures
(16) To input the needed increased or decreased value (ADJi or MCi) procedures.
(17) To input output source of value and quantity procedures.
(18) To execute supply chain quantity and value conservation calculating procedures.
(19) To output end phase or after variance quantity and value UC' procedures.
(20) To review the correct procedures automatically.
(21) To find out the cause and effect procedures.

DETAILED DESCRIPTION OF THE INVENTION

The author's invented supply chain computerized management system is a pioneer invention that has never been made public. The management principle of supply chain value conservation and quantity conservation is also a pioneer supply chain management. Based on the constitution of supply chain conservation management principle, the inventor worked out a brand new supply chain boundary conservation computer software. While performing the software, the computer is capable of constituting an applied supply chain unit cell or cell group or boundary conservation of quantity and value management system which can be used by another huge supply chain that constituted by the limited or unlimited supply chains. When there is any transaction of supply chain quantity or value, the invented software system will make mathematical operation to maintain the conservation of quantity and value. Therefore, the software system is capable of making the management of quantity and value variance for any supply chain boundary. It is especially applied to the internal management of an enterprise such as the quantity or value variance management from raw material, semi-product and finished goods etc. Hence, the invention is able to create virtual enterprise and to implement automatic pre-warning crisis computerized management system.

The following is the management principle of the updated supply chain boundary conservation unit cell and cell group: in VALUE CONSERVATION indicates:

"The grand total value of three portions of the entrance source inputs supply chain boundary total value, the total value of the before transaction initial phase unit cell, and the extra increased value of the total unit cells of the supply chain, equals to the grand total value of the two portions of the output source of the output supply chain boundary total value and the after variance end phase value."

As for the supply chain boundary in QUANTITY CONSERVATION indicates:

"The grand total quantity of three portions of the entrance source inputs supply chain boundary total quantity, the total quantity of the before variance initial phase unit cell, and the extra increased quantity of the total unit cells of the supply chain, equals to the grand total quantity of the two portions of the output source of the output supply chain boundary total quantity and the after variance end phase quantity."

The following is the mathematical management model to indicate the supply chain value conservation and quantity conservation:

$$\sum_{i=1}^{i=m} INPUTi + \sum_{i=1}^{i=n} UCi + \sum_{i=1}^{i=n} ADJi \text{ .or .} MCi = \sum_{i=1}^{i=p} OUTPUTi + \sum_{i=1}^{i=n} UCi'$$

where,
  INPUT: Entrance source inputs supply chain boundary value and quantity
    m: Numbers of entrance source of supply chain boundary
  OUTPUT: Output source outputs supply chain boundary value and quantity
    p: Numbers of output source of supply chain boundary
  UC: Unit cell initial phase or before variance value and quantity
  UC' : Unit cell end phase or after variance value and quantity
  MC (or ADJ): The extra increased quantity (such as manufacturing costs or other expenses etc.) when unit cells are performing input or output process.
    n: Numbers of unit cells included in the supply chain boundary FIG. 1 referred indicates a logistics supply chain diagram. It indicates that the limited or unlimited supply chain can be mutually combined to constitute another supply chain. Any supply chain boundary may include only a single unit cell or include cell groups etc. The FIG. 1 supply chain boundary (5) includes the other supply chain boundary (2), (3), (4) etc. The supply chain boundary (2) includes unit cell ($1_1$); supply chain boundary (3) includes two supply chain unit cells ($1_1$) and ($1_2$) which constitutes a cell group; supply chain boundary (4) includes a cell group which is constituted by three supply chain unit cells ($1_1$),($1_2$)and ($1_3$); supply chain boundary (5) includes a cell group which is constituted by four supply chain unit cells ($1_1$),($1_2$),($1_3$) and ($1_4$). All the supply chain boundaries can develop the management principle of the invented supply chain boundary conservation of quantity and value (i.e. quantity conservation and value conservation).

The mathematical model to illustrate FIG. 1 logistics supply chain boundary conservation of quantity and value is as follows:

$$\sum_{i=1}^{i=m} INPUTi + \sum_{i=1}^{i=n} UCi + \sum_{i=1}^{i=n} ADJi \text{ .or .} MCi = \sum_{i=1}^{i=p} OUTPUTi + \sum_{i=1}^{i=n} UCi'$$

A. Supply chain boundary (2), supply chain unit cell ($1_1$)
  ONE—(UC1 & UC2): m=1 ' p=2 ' n=1
  INPUT 1+UC1+0
  =IO1+IO3+UC1'
B. Supply chain boundary (3) is constituted by ($1_1$) and ($1_2$),which forms a cell group.
  TWO—UC (UC1 & UC2 ): m=2 ' p=3 ' n=2
  INPUT 1+IO4+UC1+UC2+0+0
  =OUTPUT2+OUTPUT3+IO1+UC1'+UC2'
C. Supply chain boundary (4) is constituted by ($1_1$)' ($1_2$) and ($1_3$),which forms a cell group.
  THREE—UC (UC1, UC2 & UC3 ): m=3 ' p=3 ' n=3
  INPUT 1+INPUT2+IO4+UC1+UC2+UC3+0
  =OUTPUT2+OUTPUT3+IO2+UC1'+UC2'+UC3'
D. Supply chain boundary (5) is constituted by ($1_1$)' ($1_2$) ' ($1_3$) and ($1_4$),which forms a cell group.
  FOUR—UC (UC1, UC2, UC3 & UC4): m=2,p=3,n=4
  INPUT 1+INPUT 2+UC1+UC2+UC3+UC4+0
  =OUTPUT1+OUTPUT2+OUTPUT 3+UC1'+UC2'+UC3'+UC4'

As the above examples illustrated that the more complicated organization the supply chain unit cell or cell group or boundary conservation of quantity and value computerized management system is, the better development can be made by the supply chain boundary quantity and value management. If the invented supply chain boundary conservation quantity and value software is used, it may execute immediate management among the total supply chain boundary and any one of the total boundaries. It can make immediate detection if there is any abnormal quantity or value and the supply chain boundary improvement can be made immediately. Therefore, the invention is virtually a constitution of virtual enterprise and a computerized management system for the automatic detection of crisis pre-warning.

Figure 2:
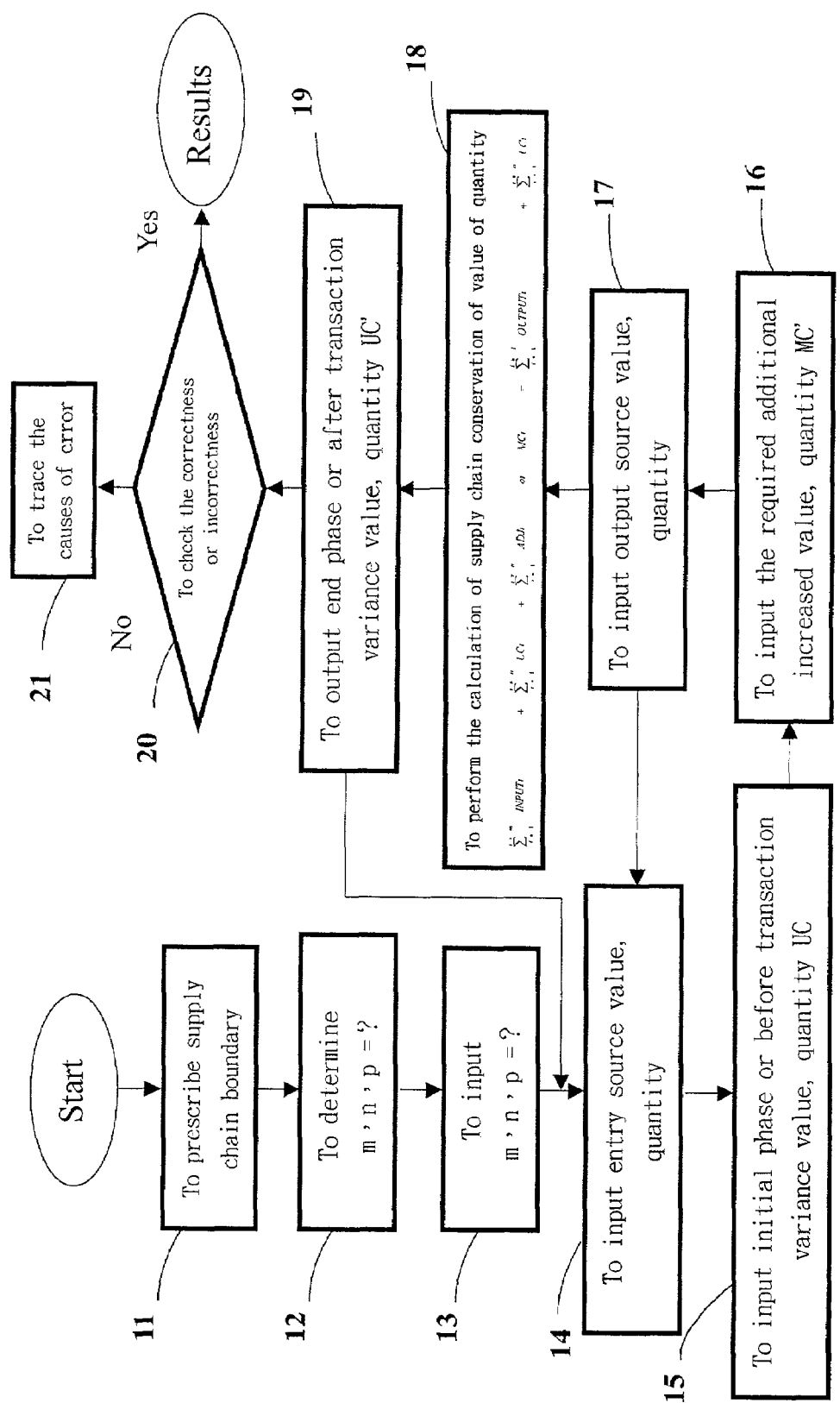
FIG. 2 indicates the process of supply chain quality and value conservation computer software.

The invention of the computer software of supply chain boundary conservation of quantity and value is in accordance with the above illustrated mathematical management principle of supply chain boundary conservation of quantity and value (i.e. value conservation and quantity conservation). It is a computer software invention which is accomplished by way of computer software program (Please refer to the second diagram). The supply chain management computer software program will execute the following procedures: first to perform the supply chain boundary step (11). The supply chain boundary will be determined by the user who determines the scope and type of supply chain detection and management. And to determine the number of m, n, p of the step (12) will be in accordance with the number of supply chain unit cell and the number of entry source and output source. Then the computer picks up the data and input the number of m, n and p according to step (13). The computer screen will immediately show the data of logistics or financial supply chain conservation of quantity and value as shown in diagrams of 3,5,6,7 and 8. The light dark colour column of value or quantity should be input by the user and the blank column indicates the computer software invention of the supply chain boundary conservation of quantity and value. The blank column will show the results by the automatic calculation of the computer. The user may input accordingly and complete the data input of entry source step (14), the data input of the initial phase or the before variance value or quantity UC step (15), input the needed increased MC' step (16) and input the entry source value, quantity step (17). Once the light dark colour columns are input with the data of value or quantity, the computer will immediately make the supply chain conservation of value and quantity mathematic calculation step (18) and the blank column will show the results data of the end phase or after variance value, quantity UC'. While the computer is making the output of the end phase or after variance value, quantity UC' step (19), the invented supply chain computerized management system is also making the detection of correction step (20) simultaneously. If both the data of supply chain boundary conservation of value and supply chain boundary conservation of quantity are correct, the computer will make the next supply chain boundary variance of quantity or value management (please refer to FIG. 2 step (17), (19) will operate to cope with step (14) to form the circulating operations). In case the data of supply chain boundary conservation of value or supply chain boundary conservation of quantity are incorrect, the computer will automatically make the warning of the incorrect supply chain unit cell so as to be able to take immediate action and execute the follow-up actions as step (21).

Therefore, the invented program system can also make correctional operations for both up level and down level supply chain boundary variance and the supply chain computer management system can implement the constitution of virtual enterprise and pre-warning crisis circumstances.

EXAMPLE

To further improve the invention is a pioneer invention, examples are given as shown as FIG. 3, FIG. 4, FIG. 5, FIG. 6, FIG. 7 and FIG. 8 which indicates different logistics or financial supply chain boundary (6). And a few practical examples in application of supply chain unit cell or cell group or boundary conservation of quantity and value computerized management system are taken to improve that the invention is certainly worthwhile, up-dated and progressive to be used by the manufacturing circles and is capable of meeting the prerequisite of being given the inventor a patent device.

(The following practical example indicates that the dark colour value or quantity column should be input by the user, and the blank column is the invented supply chain boundary conservation of value and quantity of computer software which will automatically make the calculation and show the results of immediate data of the detected information such as material issue, stock level and end phase variance etc.)

Figure 3:
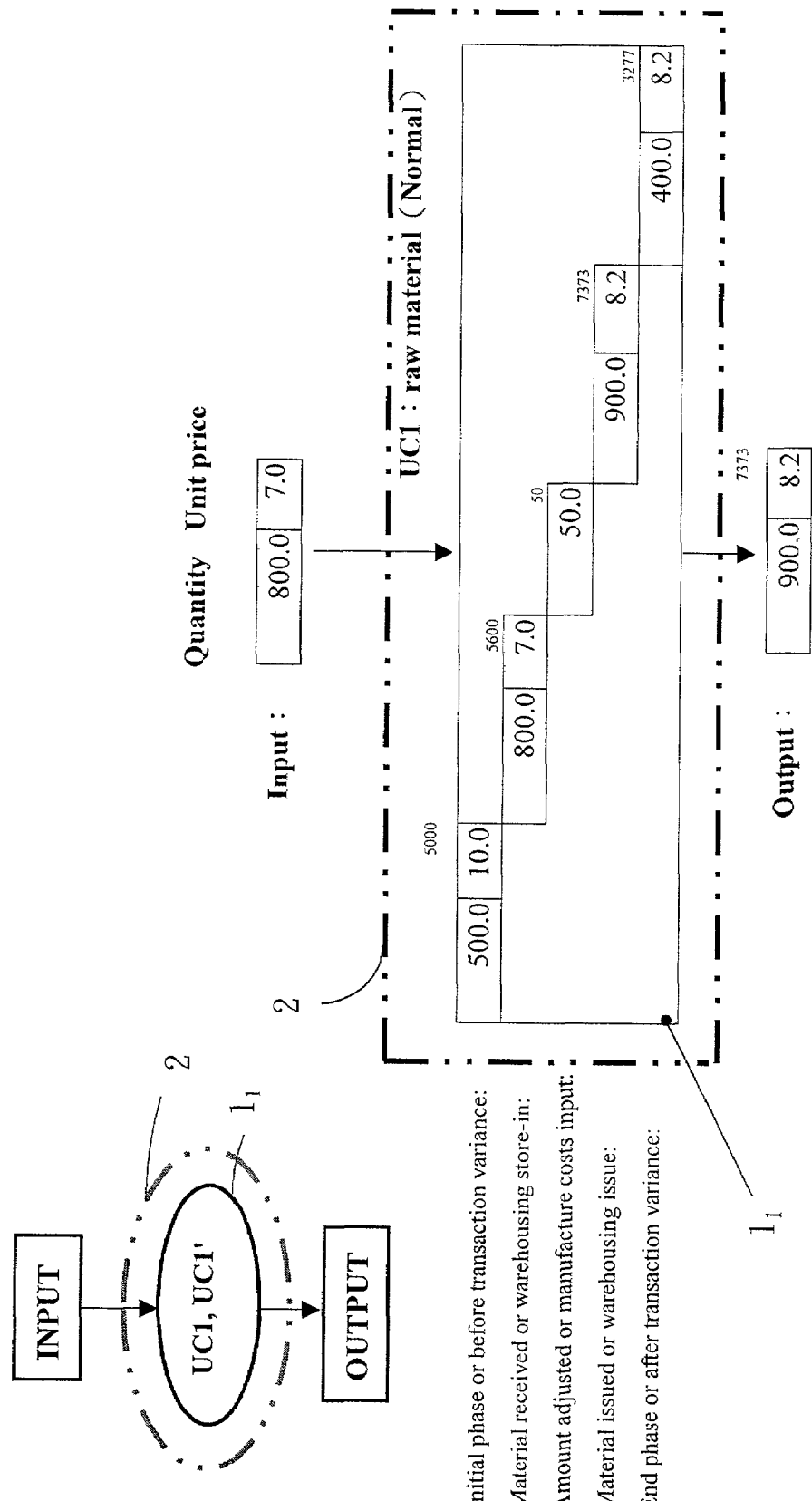
FIG. 3 indicates the supply chain boundary including unit raw material supply chain unit cell and an implementation example was given according to the invention of supply chain quantity and value conservation computer software operation of the raw material supply chain unit cell.

FIG. 3 indicates supply chain boundary including single raw material supply chain unit cell and how the supply chain conservation of value and quantity computer software works is shown as the following raw material supply chain unit cell practical example:

After the dark column of value or quantity data is input, the immediate information of material issue, stock level or end phase variance will be automatically obtained. The raw material turn-out cost price is 8.2 and a stock level of 400 each of the raw material is needed to be stored. The cost price is 8.2.

|  | Quantity  Unit Value |
|---|---|
| Initial phase or before variance or transaction | 500.0 × 10.0 |
| Material received or warehousing storage | 800.0 × 7.0 |
| Amount adjusted or costs input | 50 |
| Material issued or warehousing issue | 900.0 × 8.2 |
| End phase or after variance or transaction | 400.0 × 8.2 |
| Supply chain boundary variance VALUE CONSERVATION: | |
| Material received or warehousing store-in +Initial phase or before variance + Amount adjusted or costs store-in = Material issued or warehousing issue + End phase or after variance/transaction | |
| 5600  +5000  +50 | |
| =  7373  +3277 | (the detection is correct) |
| Supply chain boundary variance QUANTITY CONSERVATION: | |
| Material received or warehousing store-in + Initial phase or before variance = Material issued or warehousing issue + End phase or after variance/transaction | |
| 800  +500  +0 | |
| =  900  +400 | (the detection is correct) |

Figure 4:
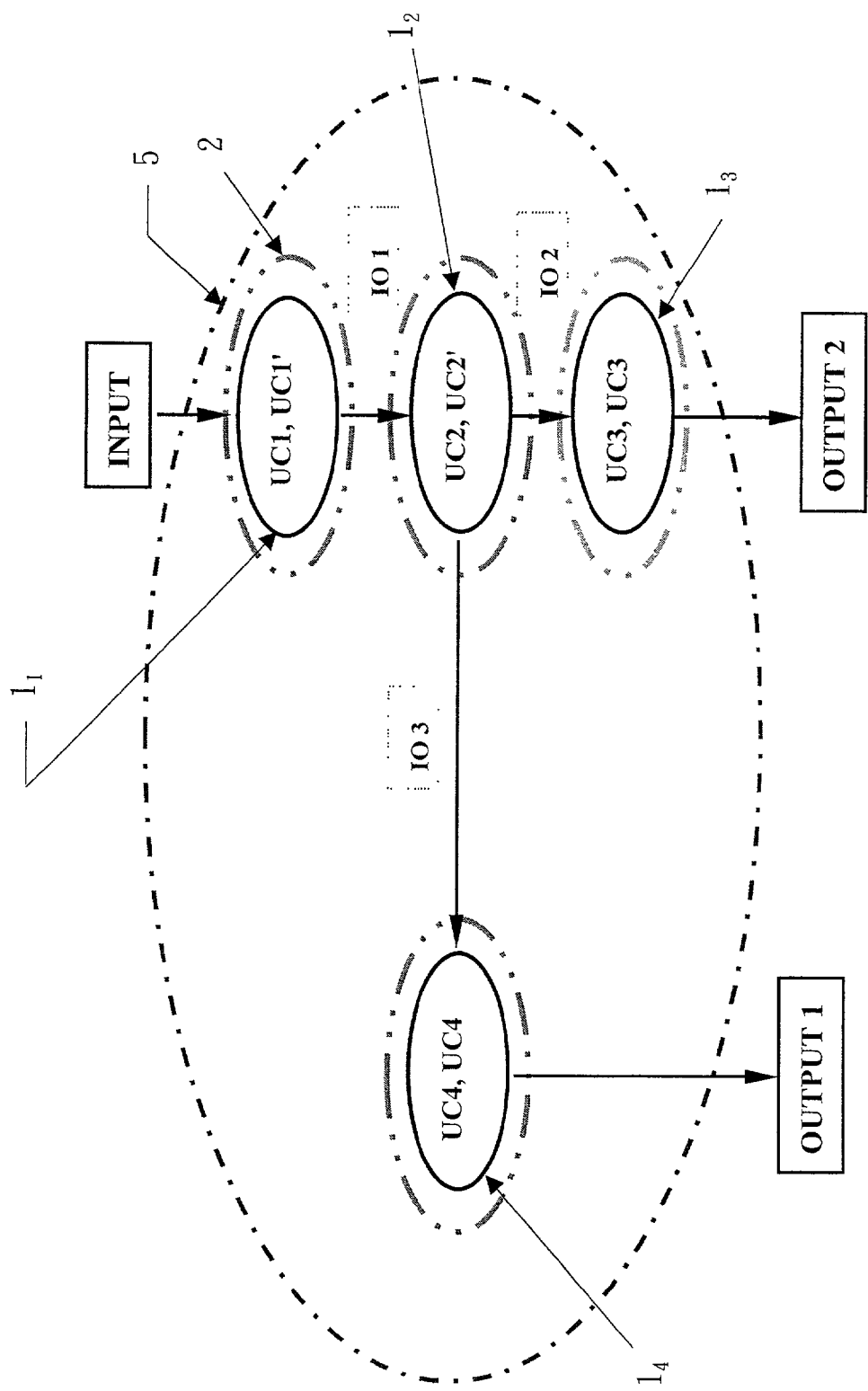
FIG. 4 indicates the output process that from raw material, products, processing waste material and finished goods to be transferred to supply chain boundary indicating the mutual relations among the four supply chain unit cells which constitutes the supply chain cell group conservation quantity and value status.
Figure 5:
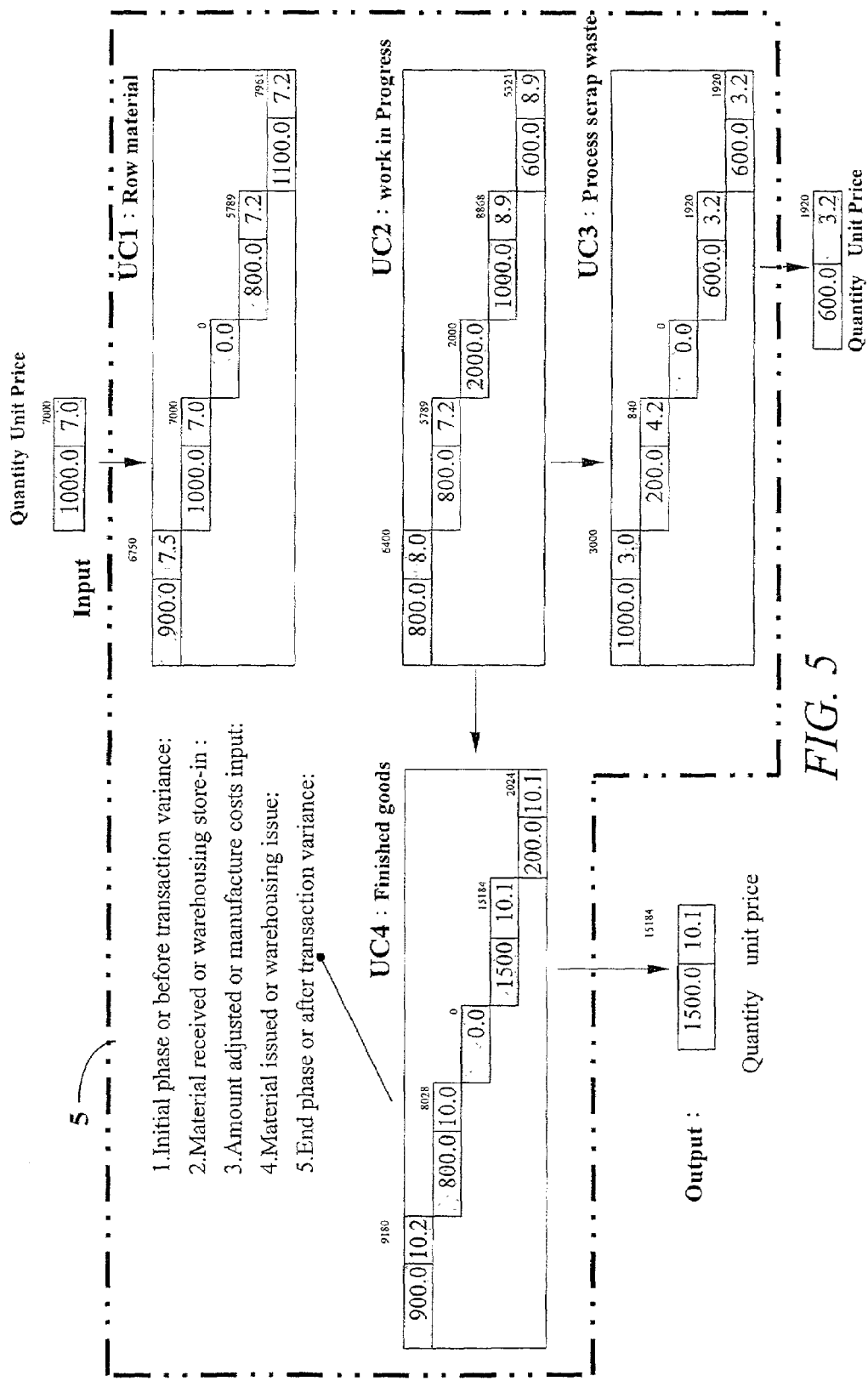
FIG. 5 is the 4th chart indicating the practical output process from raw material, products, processing waste material and finished goods and an implementation example was given indicating the invention of supply chain conservation of quantity and value computer software operation.

FIG. 4 is a practical manufacturing process with raw material, product, processing waste and finished goods, the four supply chain boundary cells and they can also be combined to enable them to be a larger supply chain boundary which shows the included four supply chain unit cells mutual relationship and the constitution status of the supply chain cell group conservation of value and quantity. FIG. 5 is the practical manufacturing process of FIG. 4 which indicates the raw material, product, processing waste and finished goods process. And a practical example was given to show the invented supply chain conservation of value and quantity computerized software operation which is a representative computerized management system for single manufacturing line. (Please refer to FIG. 5) Once the dark colour column is input with the data of value or quantity, the immediate data information of material issued or warehousing issue and end phase or after variance will be automatically obtained.

Supply chain boundary variance VALUE CONSERVATION:

Material received or warehousing storage+Initial phase or before variance+Amount adjusted or costs input=Material issued or warehousing issue+end phase or after variance.

Results (correct detection)

7000+25330+2000=17104+17226

Supply chain boundary variance QUANTITY CONSERVATION:

Material received or warehousing store-in+Initial phase or before variance material issued or warehousing issue+ End phase or after variance Results (correct detection)

1000+3600+0=2100+2500

Figure 6:
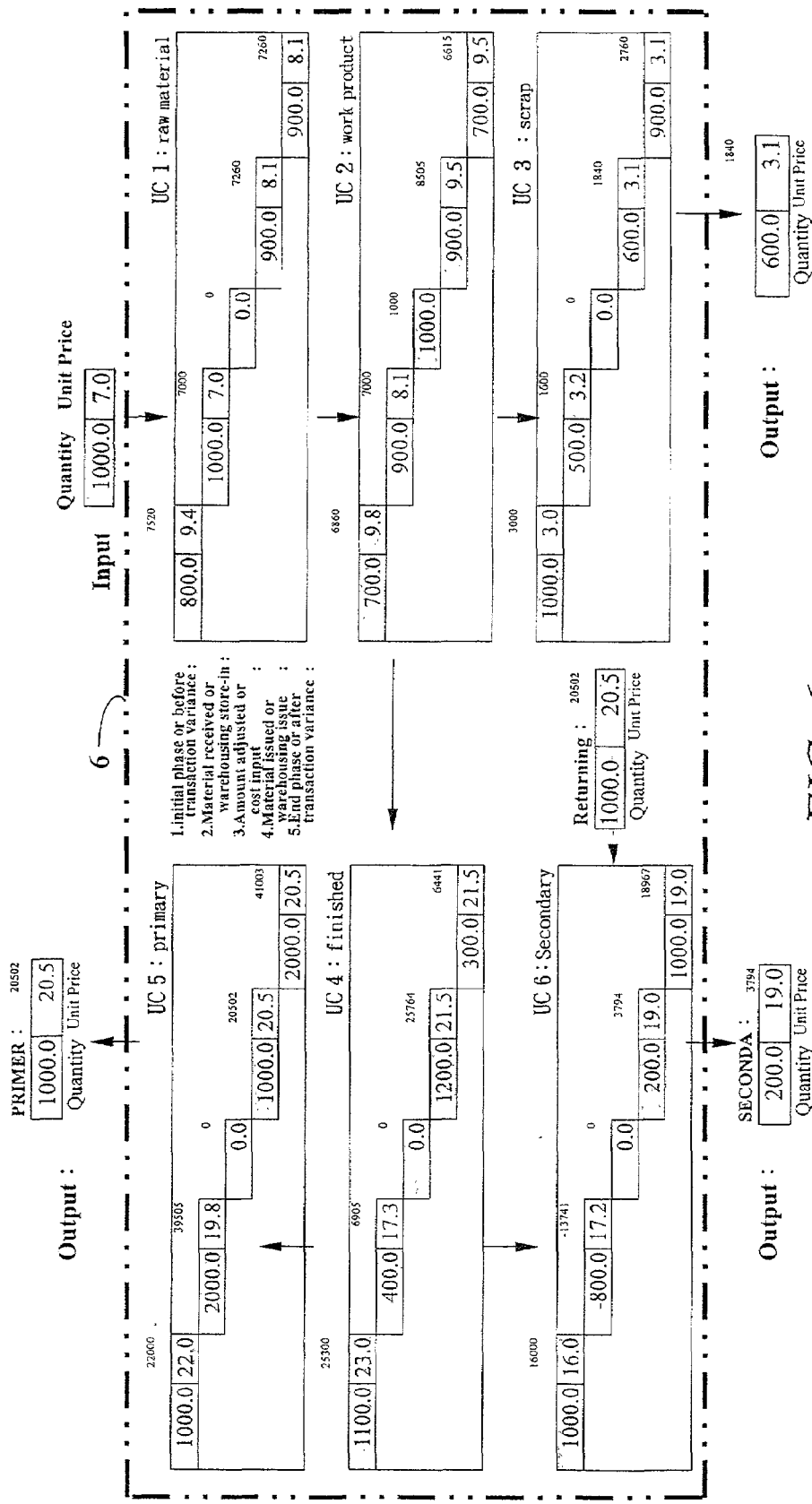
FIG. 6 is a diagram indicating the six supply chain unit cells computer management system that applies to raw material, products, processing waste material, finished goods and 1st class output and second class output.

FIG. 6 is an implementation example of a computerized management system which is composed of six supply chain unit cells of raw material, product, processing waste, finished goods, first class product and second class product (Please refer to FIG. 6). Once the dark colour column is input with the data of value or quantity, the immediate data information of value or quantity, the immediate data information of material issued or warehousing issue and end phase or after variance will be automatically acquired.

Supply chain boundary variance VALUE CONSERVATION:

Material received or warehousing store-in+Initial phase or before variance+Amount adjusted or costs input=Material issued or warehousing issue+End phase or after variance.

Results (correct detection)

27502+80680+1000=26136+83046

Supply chain boundary variance QUANTITY CONSERVATION:

Material received or warehousing store-in+Initial phase or before variance=Material issued or warehousing issue+End phase or after variance.

Results (correct detection)

2000+5600+0=1800+5800

Figure 7:
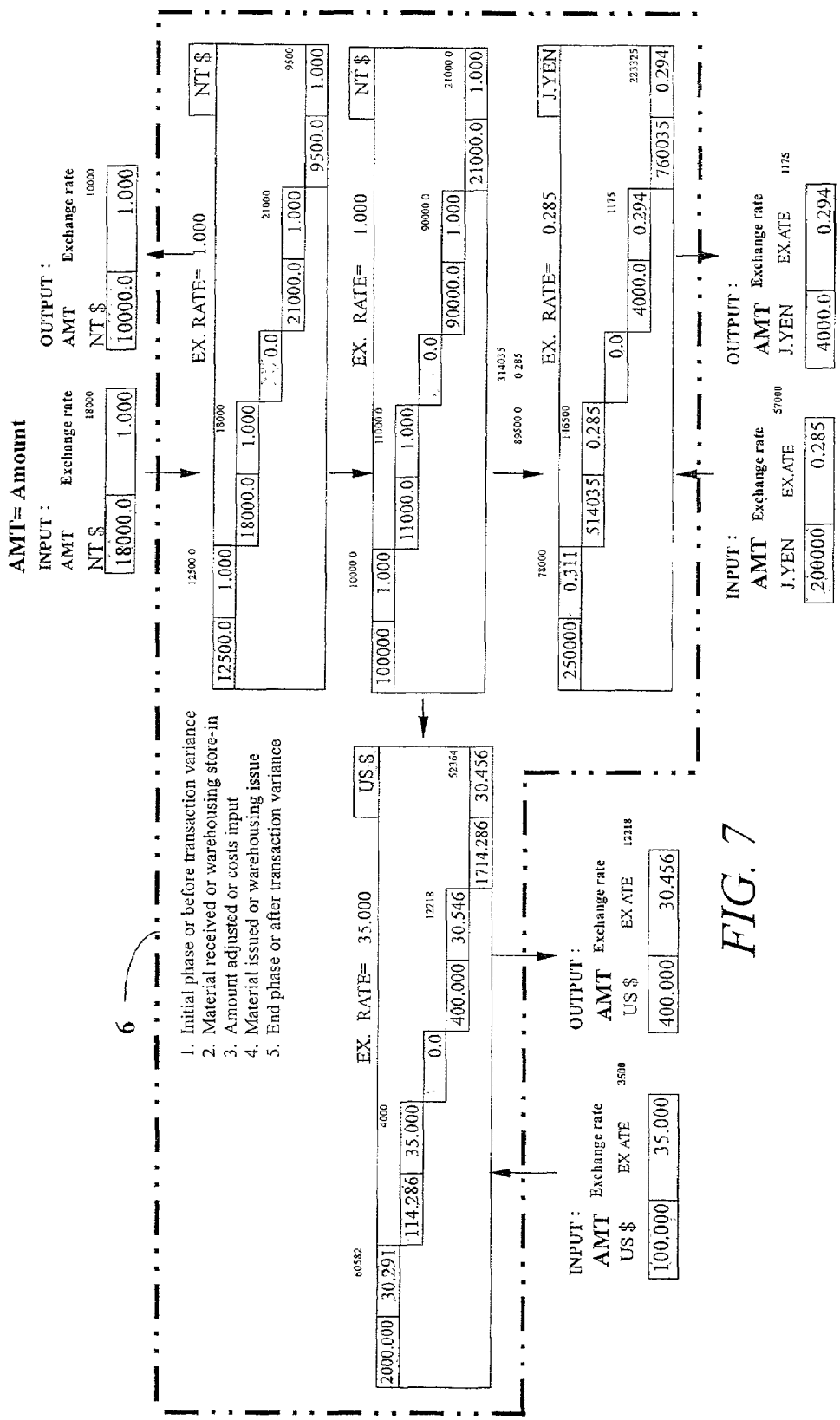
FIG. 7 is a diagram indicating the monetary exchange supply chain cell group (NTD, USD, Japanese Yuan exchange) computer management to be used by banks or companies.

FIG. 7 indicates that the invention is used by banks or company monetary exchange operations. It is a practical example of computerized management system (NTD, USD, J. Yen exchange) which is supply chain boundary composed of four cell groups. The computer management system is a considerably representative banking computer management system for the financial circles. (Please refer to FIG. 7) Once the dark colour column is input with the data of value or quantity, the immediate data information of money received or warehousing issue and end phase or after variance will be automatically acquired.

Supply chain boundary variance VALUE CONSERVATION:

To place money on deposit or warehousing store-in+Initial phase or before variance +Amount adjusted or costs input=Draw money or warehousing issue+End phase or after variance.

Results (correct detection)

78500+251082+0=23393+306189

Supply chain boundary variance QUANTITY CONSERVATION:

To place money on deposit or warehousing store-in+Initial phase or before variance =Draw money or warehousing issue+End phase or after variance.

Results (correct detection)

532149+364500+0=104400+792249

Figure 8:
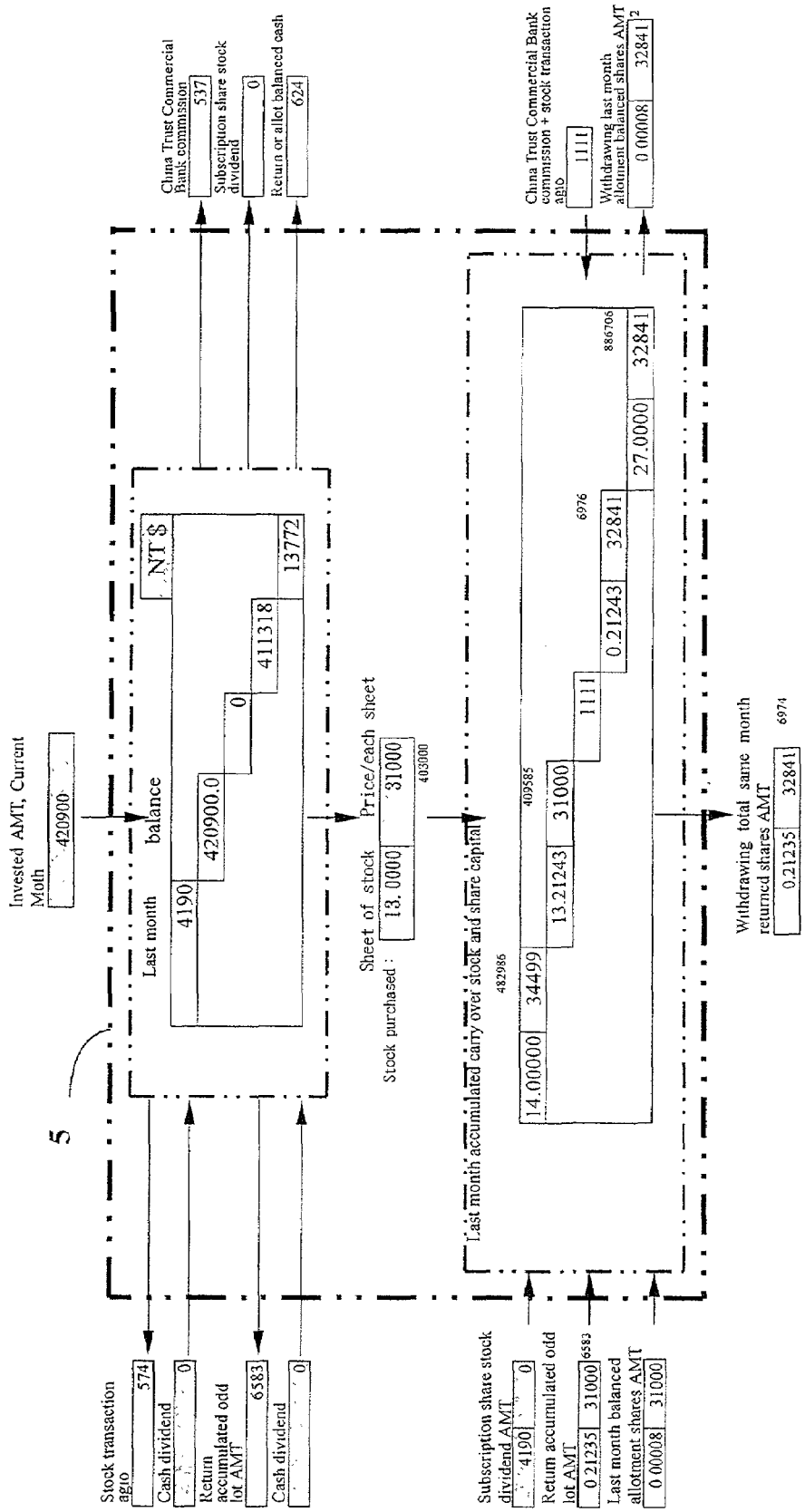
FIG. 8 is a computer management system diagram indicating the operation of stock holder cash status and stocks storage costs cell flow status.

FIG. 8 is a practical example of a cell cost flow computerized management system to be used by securities for shareholders to manage cash and stock warehousing costs. It is a considerably representative stock and cash supply chain boundary computerized management system for securities circles. (please refer to FIG. 8). Once the dark colour column is input with the data of value or quantity, the immediate data information of material issued or warehousing issue and end phase or after variance will be automatically acquired.

Supply chain boundary variance VALUE CONSERVATION:

To place cash on deposit/warehousing+Initial phase or before variance+Amount adjusted or costs input=cash issued+End phase or after variance.

Results (correct detection)

427485+487176+1111=15294+900478

Supply chain boundary variance QUANTITY CONSERVATION:

Purchased stock numbers or warehousing storage+Initial phase or before variance+Amount adjusted or costs input=Received stock numbers or warehousing issue+End phase or after variance.

Results (correct detection)

13+14+0=0+27

As the illustration given as above, I firmly believe that people can extensively understand that the innovated supply chain unit cell or cell group or boundary conservation of value and quantity supply chain computer management system is certainly a pioneer invention. It has never been made known to the public or been used up to this date. And the applicable supply chain boundary of value conservation and quantity conservation management principle is also a pioneer supply chain management principle. The innovated supply chain management is certainly worthwhile, up-dated and progressive to be used by the manufacturing circles.

What is claimed is:

1. A computer software program comprising executable code embodied on a machine readable media for execution by a computer of a supply chain computer management system, said computer software program controlling the computer of said supply chain computer management system to provide a supply chain boundary conservation of value and quantity and to provide a status output that is one of audibly/visually displayed or printed, wherein said computer software program performs at least one of a supervising and detection of a transaction variance of value and quantity and value data management by calculating the supply chain boundary conservation of value and quantity of at least one of a supply chain of a unit cell or a cell group in the supply chain boundary, wherein said computer software program operates in accordance with the following mathematical management model of the supply chain boundary conservation of value and quantity, $$\sum_{i=1}^{i=m} INPUTi + \sum_{i=1}^{i=n} UCi + \sum_{i=1}^{i=n} ADJi \text{ .or .} MCi = \sum_{i=1}^{i=p} OUTPUTi + \sum_{i=1}^{i=n} UCi'$$

where INPUT is the entrance source input supply chain boundary value and quantity; m is the number of the entrance source of the supply chain boundary; OUTPUT is the output source output the supply chain boundary value and quantity; p is the number of the output source of supply chain boundary; UC is the unit cell initial phase or before transaction variance value and quantity; UC' is the unit cell end phase or after the transaction variance value and quantity; MC or ADJ is the extra increased quantity when unit cells are performing an input or an output process; and n is the number of unit cells included in the supply chain boundary; and wherein the executable code of said computer software program causes the computer of the computer management system to perform the following steps:

(a) deciding a scope and type of supply chain detection and management to be made and an associated supply chain boundary;

(b) determining m, n, p numbers and an input computer step, which will decide the number of unit cells within the supply chain boundary and through the boundary entry source and output source number to input data to enable the computer to determine the numbers of m, n and p;

(c) inputting the entry source value or quantity step, to provide the needed information of entry source value and quantity so as to enable the computer to make supply chain boundary supervision, detection and management;

(d) inputting a required information of value and quantity as an initial phase or before transaction variance value and quantity UC step to, the computer performing the supply chain boundary supervision, detection and management, (e) inputting the required related additionally increased data MC step, which inputs the required information of value and quantity of the required related additionally increased data to the computer performing the supply chain boundary supervision, detection and management;

(f) inputting the output source quantity step, which provides a required information of the quantity of the output source to the computer performing supply chain boundary supervision, detection and management; and (g) performing the calculation of mathematical management model for supply chain boundary value conservation of value and quantity such that all of the input information in the previous steps perform a supply chain value, quantity conservation mathematic calculation;

(h) outputting an end phase or after transaction variance value and quantity UC' step, wherein after all the input information calculated in the previous steps the computer management system will provide as an output the result of value and quantity of the end phase or after transaction variance;

(i) checking the correctness or incorrectness of the previous step (h), which after all the output value and quantity of the end phase or after transaction variance is determined, the computer will check the correctness or error over the transaction variance of the quantity or value of the supply chain boundary, if it is correct, the computer will continue to make the next supply chain boundary quantity or value transaction variance management; and (j) if an error of quantity or value of supply chain boundary is found, identifying where the error occurred by causing the computer to provide as an output a warning message identifying the abnormal supply chain unit cell, to provide information to make a correction.

2. A computer software program as defined in claim 1, wherein the computer software program executed by said computer management system supervises and detects a single item raw material supply chain unit cell boundary value and quantity management system, and the said computer program obtains immediate information of a raw material warehousing issue or material issue data and an after transaction variance or end phase data.

3. The computer software program as defined in claim 1, wherein the computer software program executed by said computer management system supervises and detects raw material, products or work in progress, processes scrap waste and finished goods as four supply chain unit cells constituting a supply chain boundary of value and quantity management system, and said computer program acquires immediate information of the related warehousing issue or material issue data and the an after transaction variance or end phase data of all the four supply chain unit cells respectively.

4. The computer software program as defined in claim 1, wherein the computer software program executed by said computer management system, supervises and detects raw material, products/work in progress, processes scrap waste, finished goods, primary goods and secondary goods as six supply chain unit cells constituting a supply chain boundary of value and quantity management system, and the said computer program acquires immediate information of a related warehousing issue or material issue data and an after transaction variance or end phase data of all the six supply chain unit cells respectively.

5. A computer software program as defined in claim 1, wherein the computer software program executed by said computer management system supervises and detects bank or company monetary inventory for a foreign exchange rate cell constituted supply chain cell group boundary of value and quantity management system, and the said computer software program acquires immediate information of cash withdrawal or warehousing issue data and an after transaction variance or end phase data and the after transaction variance or end phase data of all the respective supply chain unit cells.

6. A computer software program as defined in claim 1, wherein the computer software program executed by said computer management system supervises and detects share stock and cash supply chain boundary of value and quantity management system in connection with securities firms, and the said program acquires immediate information of stock withdrawal or warehousing issue data and an after transaction variance or end phase date.

* * * * *